(12) United States Patent (10) Patent No.: US 9,217,502 B2
Wierzbowski (45) Date of Patent: Dec. 22, 2015

(54) ELECTRONIC TRANSMISSION CONTROL SYSTEM

(71) Applicant: Stanley Wierzbowski, East Patchogue, NY (US)

(72) Inventor: Stanley Wierzbowski, East Patchogue, NY (US)

(*) Notice: Subject to any disclaimer, the term of this patent is extended or adjusted under 35 U.S.C. 154(b) by 173 days.

(21) Appl. No.: 14/106,665

(22) Filed: Dec. 13, 2013

(65) Prior Publication Data

US 2014/0196559 A1 Jul. 17, 2014

Related U.S. Application Data

(60) Provisional application No. 61/735,153, filed on Jan. 17, 2013.

(51) Int. Cl.
*F16H 61/02* (2006.01)
*F16H 59/02* (2006.01)

(52) U.S. Cl.
CPC .......... *F16H 61/0204* (2013.01); *F16H 59/02* (2013.01); *F16H 2059/0221* (2013.01); *F16H 2306/14* (2013.01); *Y10T 74/20024* (2015.01)

(58) Field of Classification Search
CPC .......... F16H 61/0021; F16H 61/0204; F16H 61/0213; F16H 61/0251; F16H 2061/0075; F16H 2061/0078; F16H 59/02; F16H 59/0204; F16H 59/044; F16H 2059/0221; F16H 2306/14

See application file for complete search history.

(56) References Cited

U.S. PATENT DOCUMENTS

| | | | | |
|---|---|---|---|---|
| 5,697,864 A | * | 12/1997 | Watanabe | 477/98 |
| 6,270,444 B1 | * | 8/2001 | Tsutsui et al. | 477/143 |
| 6,615,682 B2 | * | 9/2003 | Meyer | F16H 61/2807 74/335 |
| 6,904,823 B2 | * | 6/2005 | Levin | F16H 59/044 200/61.88 |
| 7,300,381 B2 | * | 11/2007 | Badillo | B60W 10/11 477/101 |
| 8,936,532 B2 | * | 1/2015 | Razaznejad | F16H 61/0213 477/175 |
| 2004/0166990 A1 | * | 8/2004 | Buchanan et al. | 477/174 |
| 2006/0154780 A1 | * | 7/2006 | Ayabe et al. | 477/79 |
| 2010/0211275 A1 | * | 8/2010 | Kobayashi et al. | 701/55 |
| 2014/0365085 A1 | * | 12/2014 | Fujii | F16H 61/68 701/51 |
| 2015/0066316 A1 | * | 3/2015 | Fujii | F16H 61/0213 701/51 |

* cited by examiner

*Primary Examiner* — Jacob S Scott
(74) *Attorney, Agent, or Firm* — James M. Smedley LLC; James Michael Smedley, Esq.

(57) ABSTRACT

Embodiments of the present invention are directed to providing a transmission control system that enables an operator to quickly and effortlessly shift or change gears/selections/modes, in either a sequential or non-sequential manner without incurring the undesired unloading of driveline motion, while retaining consistent launches/start offs. More particularly, an improved transmission control system with an electronic gear shifter is presented for use in a vehicle or machine having an engine and transmission with a plurality of gear ratios or selections. The system allows the operator to shift gears/selections in a normal sequential progression or a progression that skips numerical order. Thus, the vehicle or machine may be accelerated and/or decelerated at a faster and more predictable rate to achieve greater performance in certain operating conditions.

6 Claims, 9 Drawing Sheets

ENGINE RPM VS. ENGINE TORQUE VS. GEAR RATIO

| ENGINE RPM | LB FT TORQUE | GEAR 1 3.5:1 | GEAR 2 2.25:1 | GEAR 3 1.5:1 | GEAR 4 1.0:1 | GEAR 5 .75:1 | GEAR 6 .5:1 |
|---|---|---|---|---|---|---|---|
| 1000 | 210 | 735 | 472.5 | 315 | 210 | 157.5 | 105 |
| 2000 | 240 | 840 | 540 | 360 | 240 | 180 | 120 |
| 3000 | 270 | 945 | 607.5 | 405 | 270 | 202.5 | 135 |
| 4000 | 305 | 1067.5 | 686.25 | 457.5 | 305 | 228.75 | 152.5 |
| 5000 | 310 | 1085 | 697.5 | 465 | 310 | 232.5 | 155 |
| 6000 | 275 | 962.5 | 618.75 | 412.5 | 275 | 206.25 | 137.5 |
| 7000 | 215 | 752.5 | 483.75 | 322.5 | 215 | 161.25 | 107.5 |

ENGINE TORQUE MULTIPLIED BY THE SELECTED GEAR RATIO EQUALS ACTUAL TORQUE OUTPUT

FIG. 8

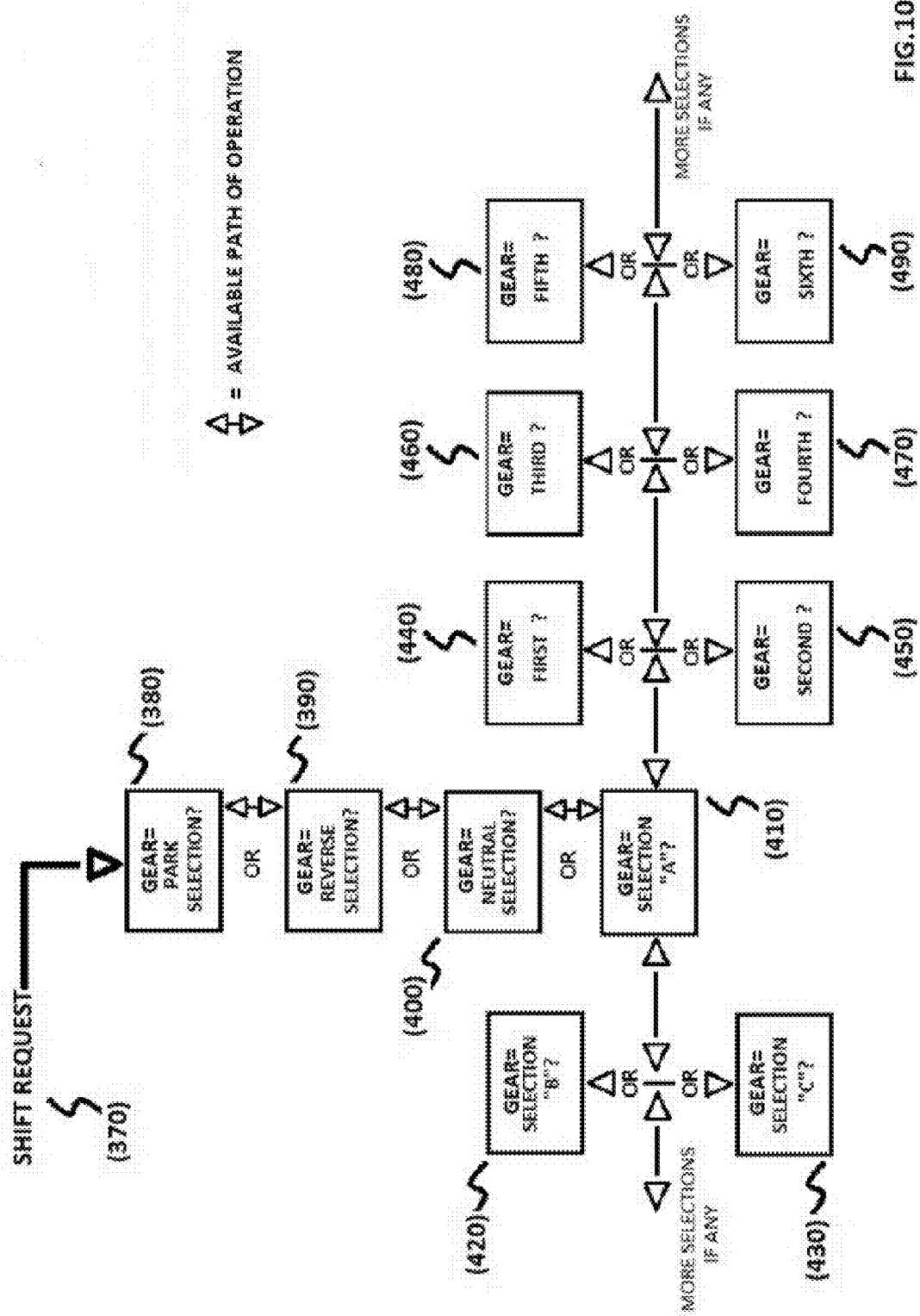

ELECTRONIC TRANSMISSION CONTROL SYSTEM

CROSS-REFERENCE TO RELATED APPLICATIONS

This application claims the benefit of the following provisional application which is hereby incorporated by reference in its entirety: 61/735,153 filed Jan. 17, 2013, the entire disclosure of which is incorporated herein by reference.

FIELD OF THE INVENTION

The present invention generally relates to transmission control systems. Specifically, this invention relates to an electronically implemented gear shifting mechanism.

BACKGROUND OF INVENTION

There are different types of transmissions and control systems available depending on the nature or requirements of the transmission being used for an application. The main options available are a fully manual/standard type transmission with a manually operated clutch for slippage, an automatic type transmission with a torque converter for slippage and some sort of automatic shifting mechanism for gear changing without full operators input or a semi-automatic/clutchless manual which uses more operator input than an automatic yet still operates a mechanical clutch between the engine and transmission automatically for slippage.

Manual or standard shift vehicles are typically driven with a multi-speed transmission that transmits rotational drive from an engine to the axles of the vehicle. The transmission is movable through several speeds at the control of a manually linkaged stick shift. In a typical transmission, a number of gears are individually engaged to provide the several speeds. In a typical manual transmission, toothed shift collars slide to engage selected gears with an output shaft. When the gears are engaged rotational drive is transmitted from the engine to the transmission. The gears and collar transmitting rotational drive carry a high torque load, which makes it difficult if not impossible for an operator to manually move the collar out of pedal, thus breaking the drive connection between the engine and the transmission. The operator is then able to easily move the gear out of engagement. To complete a shift, the operator must first move the present gear selection out of engagement as previously described using the clutch pedal into a neutral position, where the engine to transmission connection is lost, manually move the shifter lever into another gear selection and release the clutch pedal re-engaging the engine to transmission connection again.

The main benefit of a manual/standard shift style transmission is complete driver control over gear selections and shift timing. This is due to the manual selector near the operator that is not influenced by anything other than a decision made and implemented solely by the operator. This is very useful when the operator sees the upcoming events while driving and can operate the transmission out of normal sequential gear sequence to prepare the vehicle for the torque load or speed requirement that is about to occur. For example an undesirable sharp gradient/downhill slope can create an excessive speed if not regulated. This can make a turn or stop dangerous if attempted. Instead of relying solely on the vehicles brakes and chancing the overheat and brake fade, the driver can downshift quickly even out of normal sequence for aid of engine braking to maintain or regulate safer speeds without worry of overheating and possibly losing the braking system.

Some of the flaws of a manual shift style transmission are: (i) Inconsistent clutch slippage (launch or start off) that is due to human operator error; (ii) even with the aid of internal transmission synchronizers, which help to mechanically synchronize gearing in and out of engagement, sometimes downshifting more than one gear out of sequence can feel clunky, be difficult or if not timed properly can be missed and left without the engine to transmission connection completely; (iii) Undesirable time gaps between the gear selections cause a problem in racing situations where having the lowest time for a run or lap is the main objective; (iv) undesirable back and forth rocking of a vehicle during the gear changing process can be discomforting to the operator or the passengers of the vehicle if any; (v) excessive wear of driveline components due to the, sometimes even harsh, disengaging and re-engaging of the engine to transmission connection; (vi) excessive amount of attentive work from the operator to simply drive or operate the transmission. Many timed/synchronous operations are needed to be performed by the operator during normal operation. If the operations are not performed timely or correctly much damage can be done to the transmission or other components.

Automatic shifting transmissions are also driven with a multi-speed transmission that transmits the rotational drive from an engine to the axles of a vehicle. The transmission is movable through its several speeds at the control of mainly two different automatic methods. The older method uses internal centrifugal force induced components and/or engine vacuum induced components along with hydraulics. The newer method uses computer controlled solenoids/servos/actuators in valve bodies that operate hydraulics. The different gear ratios are used to achieve and overcome the different torque requirements and/or speeds. In a typical automatic transmission, much more is going on inside and out than in a typical manual transmission. Different sets of constantly meshed gearing are used with applicators for each set to achieve the different gear ratios. Applicators are usually individual sets of "clutch to steel" clutch packs, band brakes for rotating drums or a combination of both, however the manufacturer designed the specific transmission. The applicators are powered on and off hydraulically. A transmission fluid pressure pump, usually internal, is driven by the constantly running engine that the transmission is mounted to. This supplies pressure to the valve body that directs the fluid pressure to the proper applicators to make the desired gear ratios/selections. What decides the valve body fluid direction is either the older designed centrifugal force induced governors and/or engine vacuum operated solenoids or an electronically programmed controller that uses inputs from the operator and the vehicle, i.e. vehicle speed and engine load signal from an engine computer, to determine and execute the different gear ratios needed for the constantly changing torque and/or speed requirements.

Benefits of an automatic transmission are: (i) no synchronizers needed due to all the gearing always meshed and applicators used for the engaging and disengaging, making it almost impossible for the transmission to "miss a shift"; (ii) much lower, if not completely eliminated, time gaps between gear selections makes the transmission, and entire vehicle, more consistent which is a large benefit for racing purposes where time and predictability matters most; (iii) back and forth motions are eliminated due to throttle on gear changes since the engine to transmission connection is never lost during the gear change; (iv) consistent slippage ratio due to a fluid type torque converter instead of a clutch makes for consistent and predictable stop to go launches/start offs and smoother shifting gear changes; (v) extended maintenance life of other driveline components due to the constant forward rotational torque without unloading driveline motion during gear changes; and (vi) very little work for the operator to continuously operate the transmission, simply choose either Park, Reverse, Neutral or Drive/Forward and the rest is done by itself.

A flaw of an automatic transmission is that the driver can predict an upcoming event but the automatic transmission cannot. It can only work off of the real time inputs it is given and make any changes it seems is necessary. The driver does not have the full control of out of sequence gear selections if desired, i.e. quick out of sequence down shifting for engine braking on an undesirable downhill. Even with aftermarket full manual valve bodies with active, and sometimes clunky, gear shifters there still is only sequential shifting.

A semi-automatic, also known as a "clutchless manual" or "flappy paddle" style gearbox, is an actual clutch style manual gearbox or transmission with electronics and/or pneumatics to move what an operator used to move manually by themselves. It changes gears using electronic sensors, processors, actuators and pneumatics on the command of a driver and computer combined. This style transmission control system has eliminated the need for a clutch pedal, since the clutch itself is actuated by electronic equipment that can synchronize the timing and torque required to make quick and smooth launches/start offs and gear changes.

A benefit of the semi-automatic style transmission is it can make consistent launches/start offs and fairly smooth shifts like an automatic with more operator control, yet less effort than a full manual style transmission with the manually operated clutch.

Some flaws of the semi-automatic transmission are: (i) even though the launches/start offs are more consistent than a manual with a clutch pedal, it still isn't as consistent as the automatic due to the input, process and output timing needed for the processing and driving of actuators versus the natural reaction of the torque converter in the automatic; and (ii) only sequential shift changes available; (iii) uses a full mechanical clutch with zero slippage even at lower engine speeds where changing gears up or down can create the undesirable rocking. This can be both a possible loss of traction during racing applications or uncomfortable for daily drivers. Some manufacturers use a communication to the engine computer to momentarily halt power output either with ignition retarding or throttle closing to smooth out the between gear changes. This helps smooth but does not help in racing applications where full power is always desired and at the control of the driver only.

All transmissions and transmission control systems have applications where one is better than another in that particular application. However, an operator may desire: (i) less necessary effort to continually operate than a manual with clutch style system; (ii) more control over shift timing and gear selection than what an automatic or semi-automatic system can provide; (iii) more consistent launching/start offs than the semi-automatic or manual clutch style system can provide; (iv) unmissable yet "on the throttle" shifts, that the manual clutch style and semi-automatics that halt power between gear changes cannot provide; and (v) no delay between gear changes, which the semi-automatic or manual with clutch style both cannot provide.

Therefore, there is a need in the art for a transmission control system that allows the operator full control to effortlessly, yet quickly, shift gear selections in either a sequential or non-sequential manner while retaining consistent launching capabilities than any of the transmission control systems alone can provide. These and other features and advantages of the present invention will be explained and will become obvious to one skilled in the art through the summary of the invention that follows.

SUMMARY OF THE INVENTION

Accordingly, it is an aspect of the present invention to provide a transmission control system that enables an operator to quickly and effortlessly shift or change gears, in either a sequential or non-sequential manner without incurring the undesired unloading of driveline motion, while retaining consistent launches/start offs. More particularly, an improved transmission control system with an electronic gear shifter is presented for use in a vehicle or machine having an engine and transmission with a plurality of gear ratios or selections. The system allows the operator to shift gears/selections in a normal sequential progression or a progression that skips numerical order. Thus, the vehicle or machine may be accelerated and/or decelerated at a faster and more predictable rate to achieve greater performance in certain operating conditions.

The electronic control system includes an input method, a programmed processing method, a solenoid/servo/actuator driver method, a solenoid/servo/actuator activated valve body and the wiring harnesses/mechanic linkages needed depending on the specific application.

The input method can be sensors or switches of many different types. The gear selector of the present invention is similar to a conventional automobile manual transmission shifter, but it does not mechanically mesh any gears like the manual transmission shifter. Rather, the gear selector utilizes the switches and sensors to detect the desired gear ratio/selection. It may also contain the pull/push linkage needed depending on the transmission type. It is mounted within the operator's reach and can be operated in a sequential or non-sequential manner. The operator uses the shifter/gear selector to input the desired gear/selection to the programmed processing computer.

The programmed processing computer reads the input from the operator's sensor/switch mechanism and outputs the needed activations to the driver board(s).

The driver board(s) is mainly an amperage step up to activate the solenoids/servos/actuators since most processors themselves can only handle a very small amount of electrical load. The driver board outputs the proper electrical power needed to activate the solenoids/servos/actuators in order for the proper gears/selections to be made.

The electrical wiring harnesses connect the electrical components to each other while the mechanical linkage(s), only in certain applications, connect some of the mechanical components to each other before the electrical portion of the system takes control.

In automotive use, the transmission control system can be made for an "automatic transmission" and would benefit from the consistent stall speed of the transmissions torque converter, which can be sized and internally designed to best fit the application it is being used for. An "H" pattern gear shifter can be used in a sequential or non-sequential manner depending on the desired gear ratio at the time of use. If desired, an operator can skip gear ratios numerically up or down with one input or selection. For example, a racecar can make a full speed approach to a sharp upcoming turn and perform a fifth gear to second gear downshift with one selection or input after the hard braking and just reaccelerate out of the turn. This skipping of gears can be accomplished without being subjected to the multi-counting and unwanted driveline rocking of a conventional sequential, ratchet shift or paddle shift type system. One selection or input is all that is required to shift the driveline, for example, from fifth gear to second gear.

The transmission control system operates without a conventional style clutch, as it is preferably used, at the present time, with an automatic transmission. Since the transmission control system of the present invention is purely electronic with a programmed processor, and operates without a clutch or need to release the accelerator, it does not undesirably unload the driveline motion making the system beneficial for racing or heavily loaded machinery where longer shift times are undesirable. There is no "neutral" between gear selections, which provides accurate, low microsecond gear changes with even the slowest operator selection speeds or efforts. The processor simply remembers and holds the last selection made and stays in that selection until another one is fully selected. Beneficial for pre-determined gear changes where the operator foresees the upcoming events and can start moving the gear selector towards the next selection while still in the present selection, instead of an emergency fast hand motion at the last microsecond when the gear change is to be executed as in a manual with manually operated clutch system.

The transmission control system provides an electronic gear selector in communication with a computer, wherein the computer performs the actual gear shifting. A mode selector may employ a manually operated mode selector lever attached to a cable/linkage to initially pull/push a mechanical part of the transmission into "park", "reverse", "neutral", or "forward" position. The computer, however, actuates the rest of the numbered gear changes in response to an operator's gear selection using the gear shifter in the numerical gear selector portion of the shifter assembly. Once in the "forward" position, any gear ratio may be selected using, for example, an "H" pattern gear shifter. The mode selector and gear selector may be combined together in a single device and operated with a single gear shift lever.

In purely automatic transmissions without any manual mode selector levers, all selections are electronic and made by the computers output based on operators input from the shifter assembly.

In both the manual selector lever type and the fully electronic transmissions, the shifting mechanism can remain the same in style. Both designs utilize a remotely mounted shifting mechanism and a programmed computerized controller that will activate the solenoids/servos/actuators in the transmissions electronic valve body or one made for it. Original valve bodies may be, in some cases, modified to operate with the system or a completely different valve body that does operate with the system will need to be made.

The transmission control system and associated gear shifter may be used on anything that has a transmission with different directions and/or more than one gear ratio option, or would benefit from having a transmission with different directions and/or more than one gear ratio. The electronic gear shifter of the present system allows an operator to select any gear ratio with one movement of the selector without releasing the accelerator, thus keeping the driveline in motion all without clutch use, which would disengage the driveline motion.

It is a further, specific objective of this invention that the selection of the electronic gear selection control program be achieved by use of a manually operable device that provides an electronic input signal to the electronic control system processing means.

According to an embodiment of the present invention, a transmission control system for selecting gear ratios sequentially or non-sequentially based on real-time driving conditions includes: an electronic gear selector; a controller; a driver board; a communications means; a valve block; and one or more gear change components selected from the group comprising solenoids, servos, actuators and linkages, wherein said gear selector, said controller, said driver board, said communications means, said valve block and said one or more gear change components are operably connected to a transmission and wherein said controller is configured to: (1) receive a gear ratio selection signal from said gear selector, (2) process the gear ratio selection signal as a desired gear change, (3) actuate the one or more gear change components which correspond to said desired gear change in order to shift a current gear selection into a second gear selection; wherein the second gear selection is a non-sequential gear ratio move with respect to the current gear selection.

According to an embodiment of the present invention, the controller selectively actuates one or more transmission solenoids based, at least in part, on operators manual selection of the gear/mode selector.

According to an embodiment of the present invention, the controller selectively actuates one or more transmission solenoids based, at least in part, on throttle position.

According to an embodiment of the present invention, the controller selectively actuates one or more transmission solenoids based, at least in part, on engine rpm.

According to an embodiment of the present invention, the controller selectively actuates one or more transmission solenoids based, at least in part, on vehicle ground speed.

According to an embodiment of the present invention, the controller selectively actuates one or more transmission solenoids based on sensor data from the group consisting of, but not limited to, operators manual selection of the gear selector, engine RPM data, throttle position data, ground speed data, current gear ratio, Hall Effect data, torque sensor data, vehicle weight, tire diameter, tire circumference, tire pressure, and any combination thereof.

According to an embodiment of the present invention, the gear selector is actuated by the operator.

According to an embodiment of the present invention, the gear selector is, but not limited to, manually actuated and/or chosen.

According to an embodiment of the present invention, the gear selector comprises a mode selector.

According to an embodiment of the present invention, a transmission control method includes the steps of: receiving a gear ratio selection/selection/mode signal from a gear selector; processing the gear ratio selection/selection/mode signal as a desired gear change; and actuating one or more gear change components, selected from the group comprising solenoids, servos, actuators and linkages, which correspond to said desired gear change in order to shift a current gear selection into a different gear selection, wherein the different gear selection is a different selection/mode or sequential/non-sequential gear ratio move with respect to the current gear selection.

These and other objects, features and advantages of the invention will become more fully apparent in the following detailed description, taken in conjunction with the accompanying drawings.

BRIEF DESCRIPTION OF THE DRAWINGS

FIG. 1 is a perspective view of a performance vehicle to which embodiments of the present invention might be suited for;

FIG. 2 is a perspective view of a commercial vehicle to which embodiments of the present invention might be suited for;

FIG. 8 is a table of engine torque data, as seen in FIG. 6, in relation to engine rpm and gear ratio of a typical 6 speed transmissions gearing set for a vehicle incorporating a transmission control system in accordance with the embodiments of the present invention;

FIG. 10 is a process flow diagram, showing an exemplary method, in accordance with an embodiment of the present invention.

DETAILED SPECIFICATION

Figure 1:
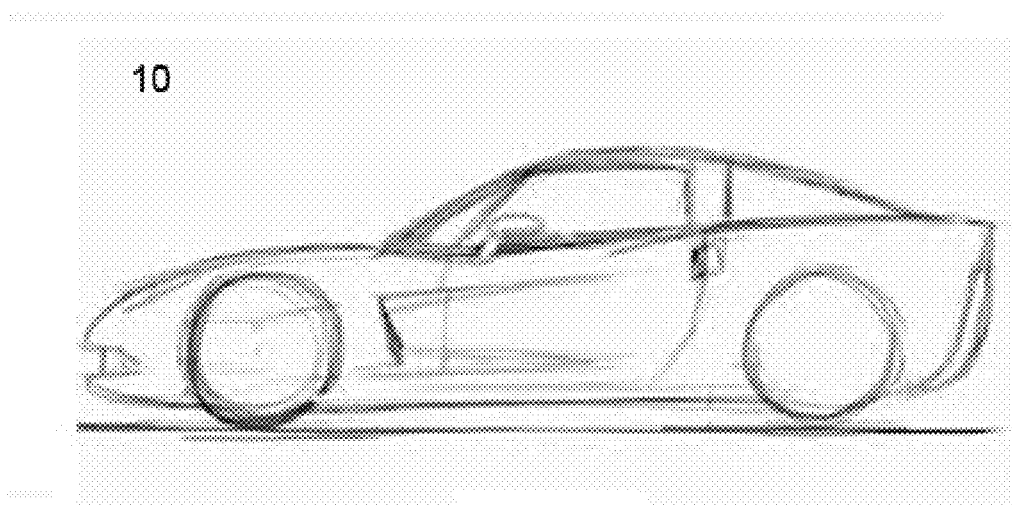
Figure 2:
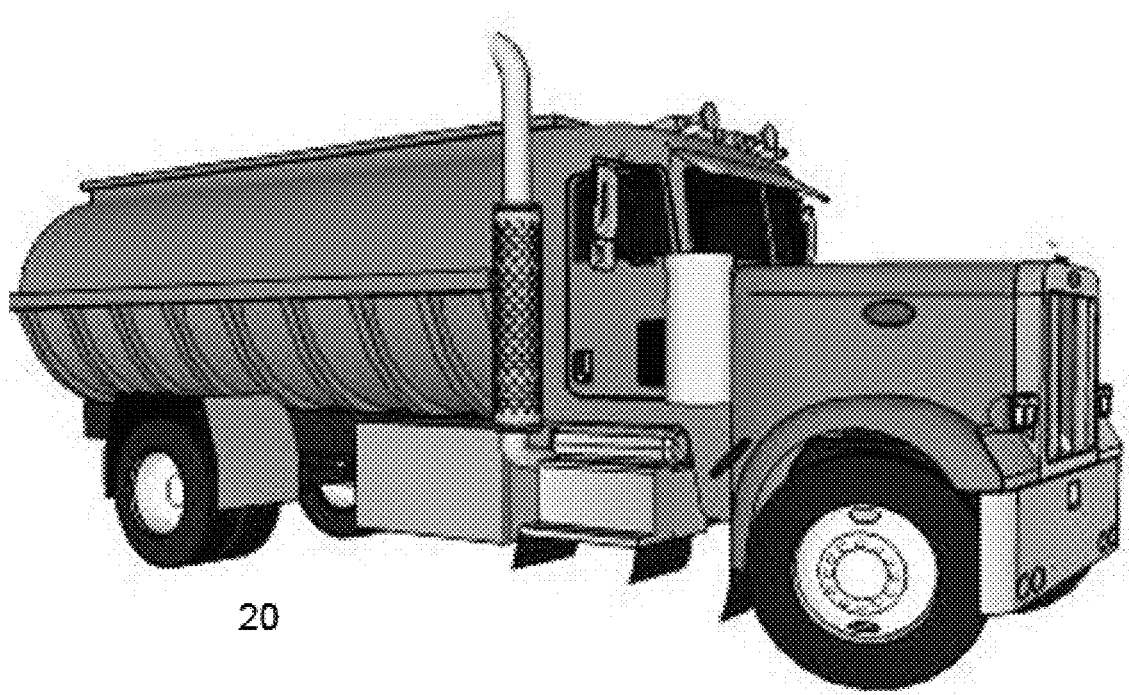

Referring to the drawings, wherein reference characters designate like or corresponding parts throughout the views. FIG. 1 illustrates a vehicle 10, designed for high performance racing that is especially suited for application of the present invention. As is common in the art, the vehicle is provided with an engine, drive tires, and vehicle operator station. FIG. 2 illustrates a commercial vehicle 20 for which embodiments of the present invention are especially suited for. One of ordinary skill in the art would appreciate that there are numerous vehicles and other motorized apparatuses that could utilize embodiments of the present invention and embodiments of the present invention are contemplated for use with any vehicle.

Figure 3:
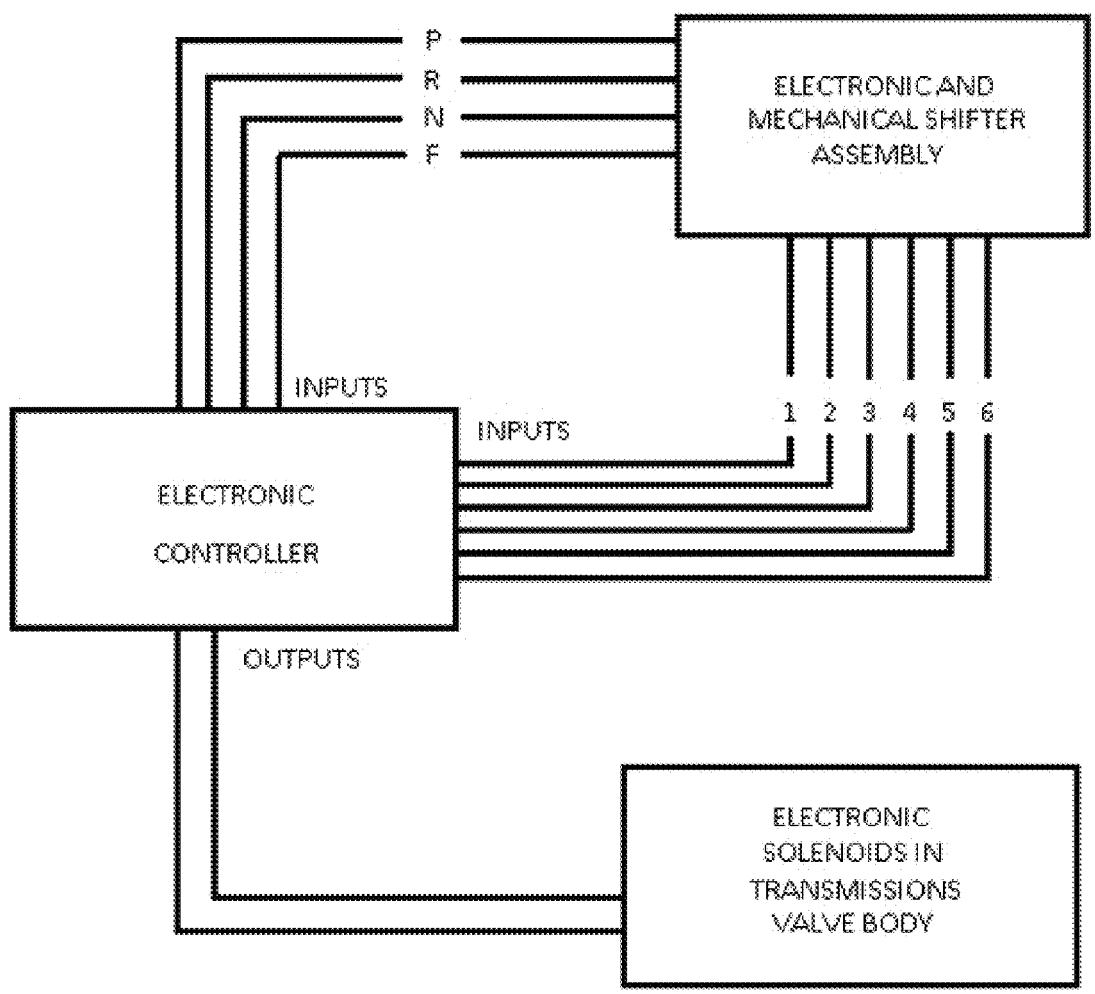
FIG. 3 is a block diagram illustrating a transmission control system, an accordance of an embodiment of the present invention.
Figure 4:
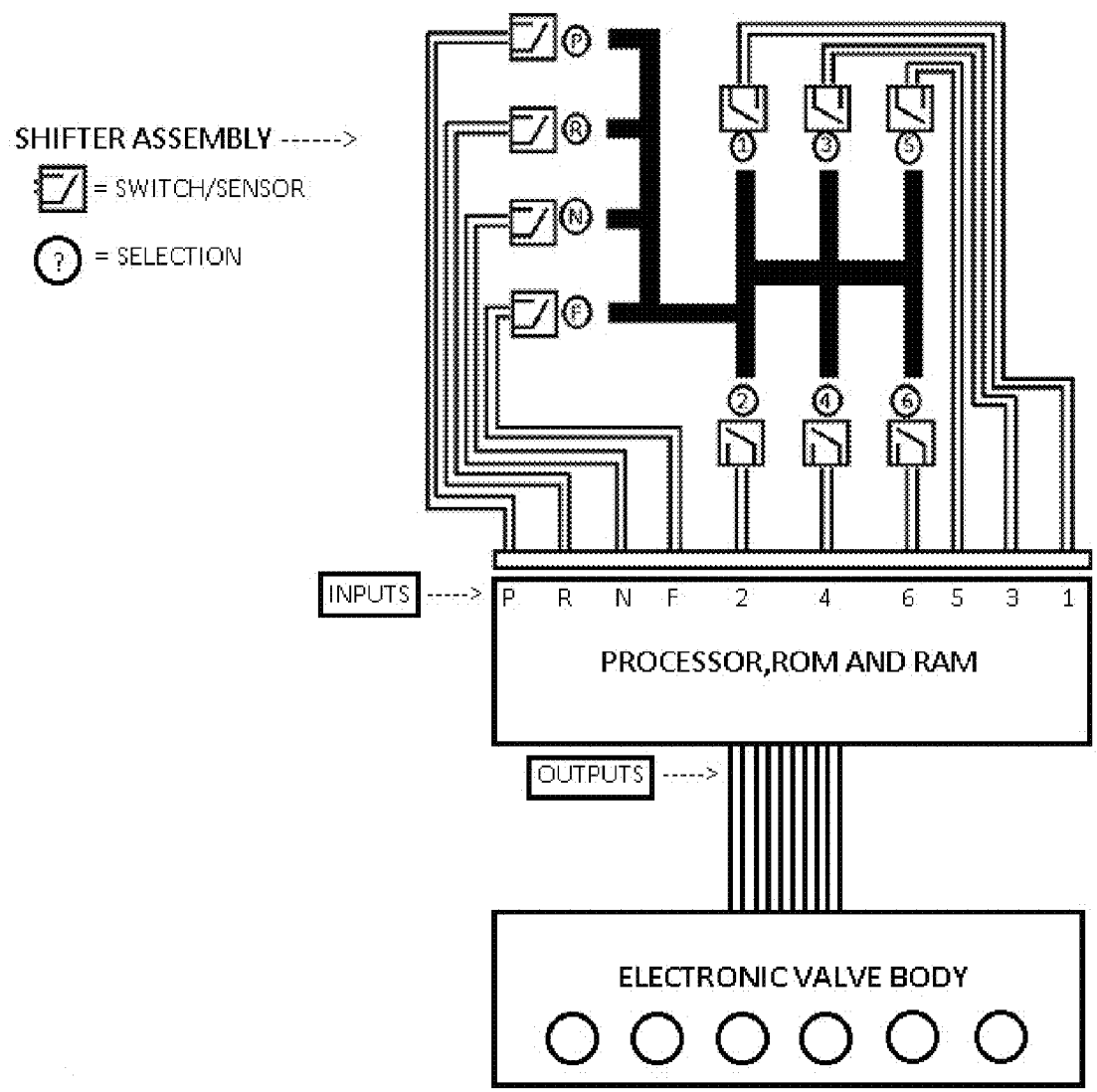
FIG. 4 is an electrical block diagram illustrating, in further detail, a portion of the transmission controller in FIG. 3.

Turning now to FIG. 3, a transmission control system, in accordance with an embodiment of the present invention, is shown. The transmission control system is operable for control of a vehicle having an engine and a transmission with a plurality of gear ratios and enables the operator of a vehicle to employ a normal sequential gear ratio progression, a nonsequential gear ratio progression which skips certain ratios from the normal progression, or any combination thereof. The nonsequential gear progression may be used, for example, (i) when a slower rate of acceleration is desired for safety or other reasons like starting off in second in snow or (ii) when increased rate of deceleration is desired and achieved through dropping to lower gears out of normal sequence for assistance from engine breaking Embodiments of the present invention allow an operator of the vehicle to readily and quickly change gears, while the control system protects against overloads of vehicle drive train components and prevents undesired unloading of driveline motion. In the illustrated embodiments as hereinafter described, the selected gear ratio is obtained through an electronic control system comprising an electronic controller, a shifter assembly, a soleoid/servo/actuator activated vale body and one or more wiring harnesses and/or mechanical linkages (as required depending on the specific embodiment or application of the invention), but it would be understood by one of ordinary skill in the art that other equivalent means may be employed.

According to an embodiment of the present invention, the electronic controller includes a processing means configured to allow for the processing of input data and affect changes in gear ratios based on a processing of that data. The electronic controller may be further comprised of a computer readable medium or memory that is configured to store and utilize software implemented means for instructing the processing means to take specific actions related to the switching of gears (potentially in a non-sequential manner), generally based upon, at least in part, data provided to the electronic controller. In preferred embodiments of the present invention, the electronic controller may be further comprised of one or more input means, one or more processing means, one or more solenoid/servo/actuator driver means, or any combination thereof.

According to an embodiment of the present invention, the one or more input means could be selected from the group comprising, but not limited to, (i) sensors, such as a throttle position sensor, an RPM sensor 34, a Hall Effect sensor 230, or a ground speed sensor, or (ii) switches of many different types; or (iii) any combination thereof. One of ordinary skill in the art would appreciate that there are numerous types of sensors and switches that could be utilized with embodiments of the present invention and embodiments of the present invention are contemplated for use with any appropriate type of sensor or switch.

According to an embodiment of the present invention, the gear selector of the system may be similar to a conventional automobile manual transmission shifter, however the gear selector of the system does not mechanically mesh any gears like a manual transmission shifter. Rather, in preferred embodiments of the present invention, the gear selector utilizes the switches and sensors to detect the desired gear ratio/selection. In certain embodiments, the gear selector may also contain one or more pull/push linkages, depending on the transmission type utilized with the system.

In a preferred embodiment of the present invention, the gear selector is mounted within reach of an operator of the vehicle, such that the gear selector can be operated in a sequential or non-sequential manner. The operator uses the shifter/gear selector to input the desired gear/selection to the programmed processing computer. Possible locations for the gear selector include, but are not limited to, on or near a center console of a vehicle, on or near a steering column of a vehicle, on or near a dashboard of a vehicle, on or near a command console of a vehicle, or any combination thereof. One of ordinary skill in the art would appreciate that the placement of the gear selector could vary depending on vehicle type and transmission type, and embodiments of the present invention are contemplated for use with the gear selector being placed in any location accessible to a driver or other vehicle operator required to utilize the gear selector.

According to an embodiment of the present invention, the processing means of the system may be comprised of one or more of a processing means, a read only memory (ROM), a random access memory (RAM), a storage medium or any combination thereof. In a preferred embodiment of the present invention, the processing means is configured to read input from the input means, process the input from the input means in order to select the needed activations and output the needed activations to one or more driver board(s).

According to an embodiment of the present invention, the one or more driver boards are mainly an amperage step up to activate one or more solenoids, servos, actuators or some combination thereof. This is primarily due to the fact that most processing means themselves can only handle small amounts of electrical load, with such electrical load being too minimal to affect the activation of the one or more solenoids, servos or actuators. Therefore, in accordance with a preferred embodiment of the present invention, a driver board outputs the proper electrical power needed to activate the one or more solenoids, servos, and/or actuators in order for the proper gears/selections to be made.

According to an embodiment of the present invention, one or more electrical wiring harnesses connect electrical components of the system to one another. In certain embodiments, the system may be comprised of mechanical linkage(s), where connection of some of the mechanical components to each other before the electrical portion of the system takes control is required.

In automotive use, embodiments of the transmission control system can be made for an "automatic transmission" and would benefit from the consistent stall speed of a transmissions torque converter, which can be sized and internally designed to best fit the application it is being used for. In a preferred embodiment, an "H" pattern gear shifter can be used in a sequential or non-sequential manner depending on the desired gear ratio at the time of use. If desired, an operator can skip gear ratios numerically up or down with one input or selection. For example, a racecar can make a full speed approach to a sharp upcoming turn and perform a fifth gear to second gear downshift with one selection or input after hard braking and just reaccelerate out of the turn. This skipping of gears can be accomplished without being subjected to the multi-counting and unwanted driveline rocking of a conventional sequential, ratchet shift or paddle shift type system. One selection or input is all that is required to shift the driveline, for example, from fifth gear to second gear. One of ordinary skill in the art would appreciate that embodiments of the present invention could allow for the shifting of gears in any non-sequential manner, and embodiments of the present invention are contemplated for use in applications allowing for the selection of any gear in a non-sequential manner.

In the preferred embodiment of the present invention, the transmission control system operates without, but is not limited to, a conventional style clutch. Since this preferred embodiment of the transmission control system is purely electronic, controlled by the processing means, and operated without a clutch or need to release the accelerator, the system does not undesirably unload the driveline motion, thus making the system beneficial for racing or heavily loaded machinery where longer shift times are undesirable. There is no "neutral" between gear selections, which provides accurate gear changes occurring in the order of a few nanoseconds to a few microseconds, depending on the processing power of the processing means and the latency of communication with the other components contained in the system. These gear changes are affected at these speeds with even the slowest operator selection speeds or efforts. The processing means simply remembers and holds the last selection made and stays in that selection until another one is fully selected. This feature is particularly beneficial for pre-determined gear changes where the operator foresees the upcoming events (e.g., elevation changes, turns, curves, hazardous road conditions) and can start moving the gear selector towards the next selection while still in the present selection, instead of an emergency fast hand motion at the last microsecond when the gear change is to be executed as in a manual transmission with a manually operated clutch and mechanical gear meshing linkage type system.

According to embodiments of the present invention, the transmission control system provides an electronic gear selector in communication with the processing means, wherein the processing means performs the actual gear shifting. In a preferred embodiment, a mode selector may employ a manually operated mode selector lever attached to a cable/linkage to initially pull/push a mechanical part of the transmission into one or more of a "park", "reverse", "neutral", or "forward" position. The processing means, however, in conjunction with other components of the system, actuates the rest of the numbered gear changes in response to an operator's gear selection using the gear shifter in the numerical gear selector portion of the shifter assembly. Once in the "forward" position, any gear ratio may be selected using, for example, an "H" pattern gear shifter. The mode selector and gear selector may or may not be combined together in a single device and operated with a single gear shift lever. For the purposes of this application a mode selector could be used interchangeably with the term gear selector to denote a selector that affects the change of one or more of a gear, a mode or any combination thereof.

According to an embodiment of the present invention, in a purely automatic transmission, without any manual mode selector levers, all selections are electronic and made by the processing means, in conjunction with other components of the system, based on operators input from the shifter assembly.

In both the manual selector lever type and the fully electronic transmissions, the gear selector can remain the same in style. Both designs utilize a remotely mounted gear selector and a processing means (in conjunction with other components of the system) that will activate the solenoids/servos/actuators in the transmissions electronic valve body or one made for it. Original valve bodies may be, in some cases, modified to operate with the system or a completely different valve body that does operate with the system will need to be made.

According to an embodiment of the present invention, the transmission control system and associated gear selector may be used on anything that has a transmission with different directions and/or more than one gear ratio option, or would benefit from having a transmission with different directions and/or more than one gear ratio. The electronic gear selector of the present system allows an operator to select any gear ratio with one movement of the selector without releasing the accelerator, thus keeping the driveline in motion all without clutch use, which would disengage the driveline motion.

It is a further, specific objective of this invention that the selection of the electronic gear selection control program be achieved by use of a manually operable device that provides an electronic input signal to the electronic control system processing means.

Figure 5:
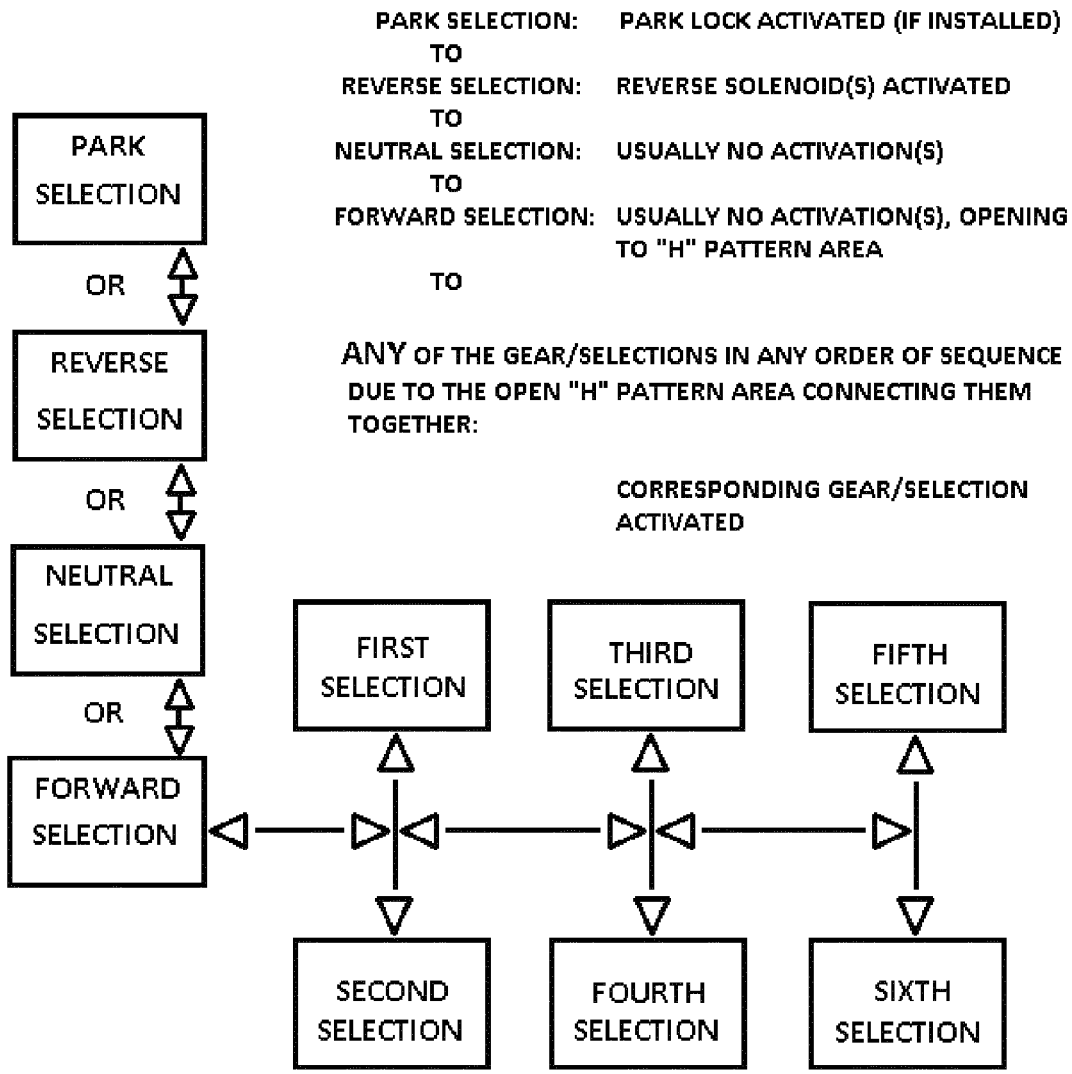
FIG. 5 is a generalized flowchart showing the organization of a program used with the electronic system, in an accordance of the embodiment of the present invention.
Figure 6:
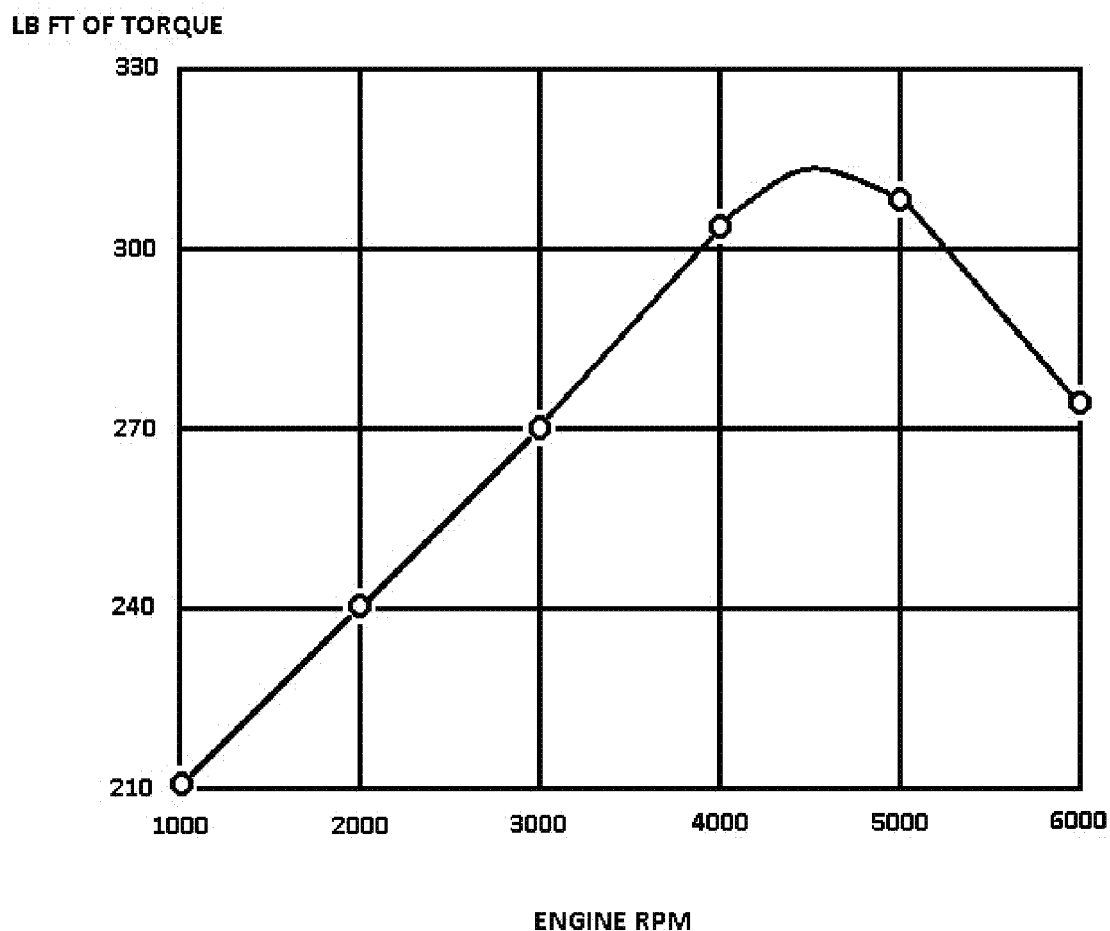
FIG. 6 is a graph of engine torque data in relation to engine rpm for a vehicle incorporating a transmission control system in accordance with the embodiments of the present invention.
Figure 7:
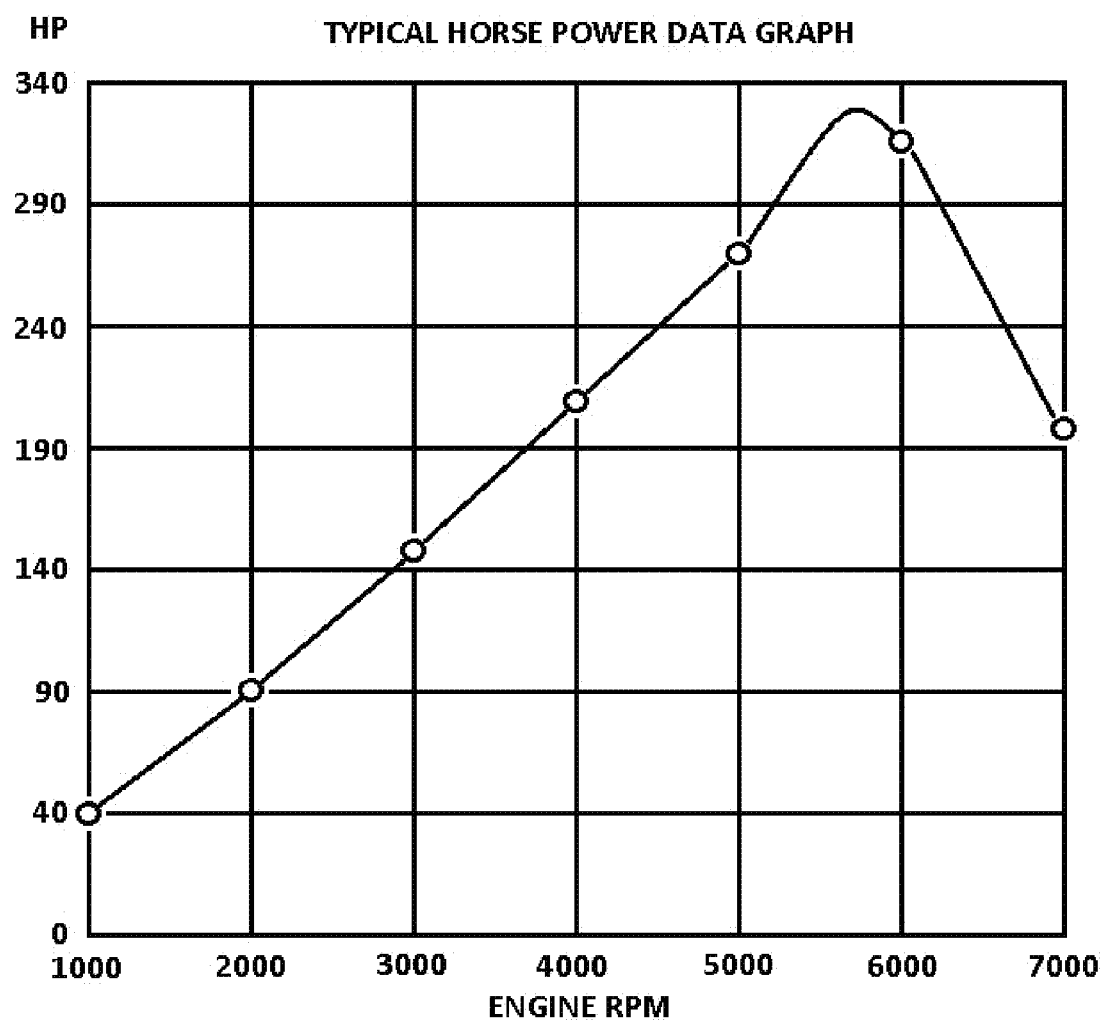
FIG. 7 is a graph of engine horse power in relation to engine rpm for a vehicle incorporating a transmission control system in accordance with the embodiments of the present invention.
Figure 9:
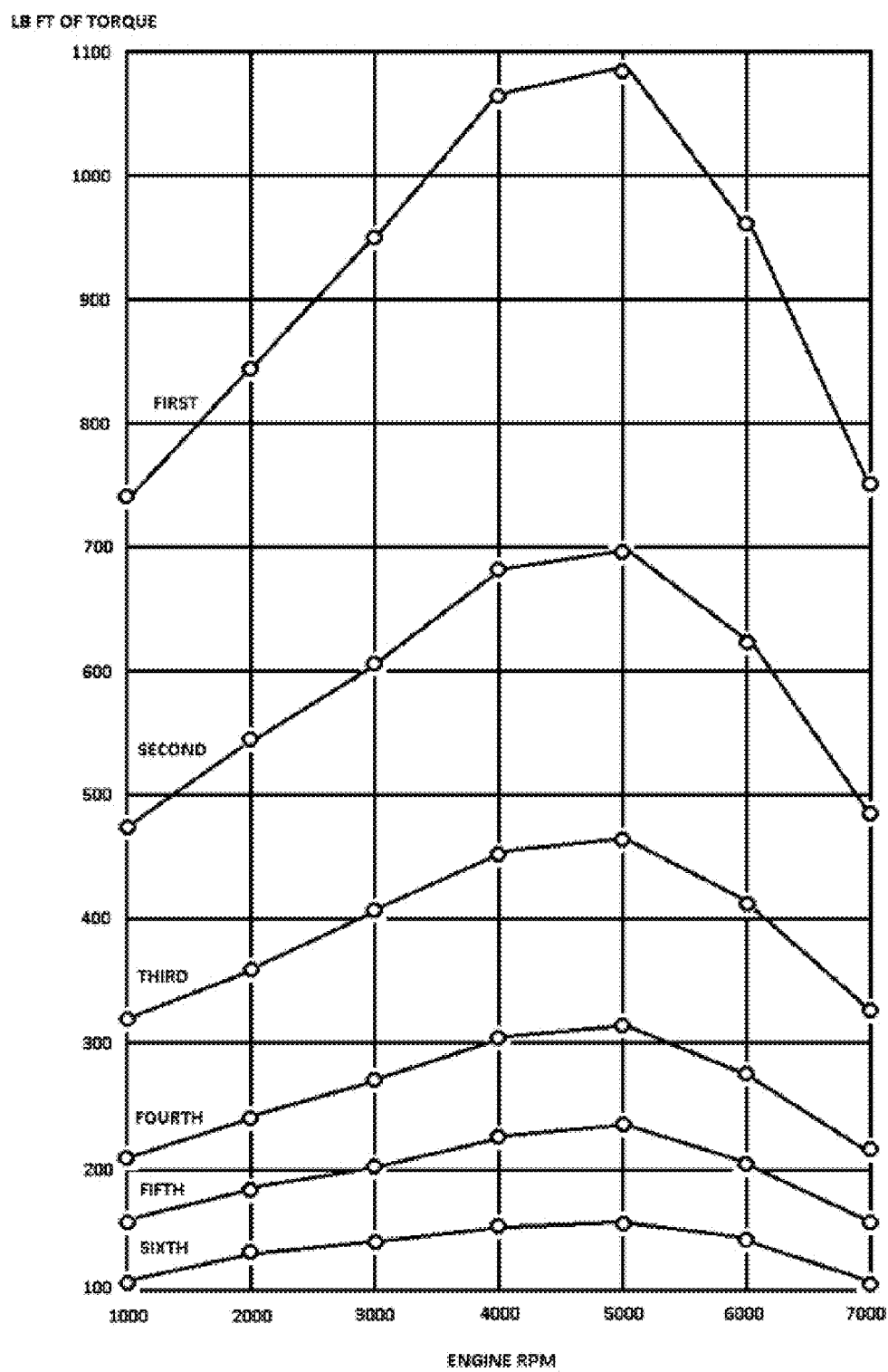
FIG. 9 is a graph of engine torque data in relation to engine rpm across multiple gears for a vehicle incorporating a transmission control system in accordance with embodiments of the present invention.

As previously discussed, the transmission control system of the present invention allows gear skipping with or without certain operating parameters and/or other safety constraints. For example, when the system is coupled to an automatic transmission, and one or more automatic modes is one or more of the selections for example in FIG. 5 selection "A" can be used for a normal (for a daily driving style) electronically mapped out and executed shifting sequence, FIG. 5 selection "B" can be used for best performance and most engine braking type driving/shifting style and FIG. 5 selection "C" might be used for best economy and least engine braking driving/shifting style, the processing means may determine the optimal gear ratio to shift into based on a torque curve/data and/or a horse power (hp) curve/data, as shown in FIGS. 6, 7, 8 and 9. In addition, various calculations may be employed to determine the next higher/lower gear ratio, such as shifting when next gear torque is equal or greater to current gear torque at lower RPMs. FIG. 9 shows a torque curve for various gears (first through sixth) in a hypothetical exemplary embodiment of the present invention. The last gear of any transmission has the highest top speed and the lowest engine rpm for any given speed yet it also has the lowest amount of applying torque. Therefore the multitude of gears is needed to have the graduating, fastest and most efficient acceleration while having a higher top speed and lowest cruise rpm for any given speed desired.

Embodiments of the present invention may include safety features that override dangerous and/or potentially damaging gear skipping by the operator, while others may not. For example, the processing means of the control module may, may not or both, be programmed to ignore any operator gear selections that might be hazardous. Under such circumstances, the system would maintain the current gear ratio rather than complying with an unsafe gear selection request. A person of ordinary skill in the art will understand that safety parameters or constrains may be based on one or more data inputs, such as engine RPM, ground speed, torque, tire diameter, tire pressure, throttle position, etc.

Turning now to FIG. 10, a flowchart showing a subroutine for performing a shift procedure, performed by the system, under control of a stored program, in accordance with an embodiment of the present invention, is shown. Upon receiving a shift request as indicated by block 370, the processing means determines which gear has been selected by recognizing the input sensor selected by the operator of the system at that specific time The system and/or shifting mechanism can be programmed and/or designed with any sequence of "operations" depending on application. According to the embodiment of the present invention, normal circumstances of the system starts in the still or park position block 380. If the processing means recognizes the input from the block 380 sensor it indicates P or "park" and the program instructs the processing means to leave all unnecessary solenoids, servos, and/or actuators deactivated and actuate the park solenoid only. Otherwise, if the processing means recognizes input from block 390 it determines the gear selector to be in R or "reverse". If so, the program instructs the processing means to actuate only what makes reverse engage. If the processing means recognizes input from block 400 it determines the gear selector to be in N or "neutral". If so, the program instructs the processing means to only actuate what allows neutral to occur. If the processing means recognizes input from block 410 it determines the selector to be in "gear selection A". If so, the program instructs the processing means to execute selection "A" program which could be either a single gear or an automatic mode whichever it is programmed to be. If the processing means recognizes input from block 420 it determines the selector to be in "gear selection B". If so, the program instructs the processing means to execute selection "B" program which could be either a single gear or an automatic mode whichever it is programmed to be. If the processing means recognizes input from block 430 it determines the selector to be in "gear selection C". If so, the program instructs the processing means to execute selection "C" program which could be either a single gear or an automatic mode whichever it is programmed to be.

All selections are capable of being programmed in any order and to be either a one gear only selection or executable patterned program, but in the embodiment of the present invention, If the processing means recognizes input from block 440 it determines the selector to be in "gear selection FIRST". The program instructs the processing means to execute FIRST GEAR program and actuate the components/solenoids/servos/actuators that only engage first gear. If the processing means recognizes input from block 450 it determines the selector to be in "gear selection SECOND". The program instructs the processing means to execute SECOND GEAR program and actuate the components/solenoids/servos/actuators that only engage second gear. If the processing means recognizes input from block 460 it determines the selector to be in "gear selection THIRD". The program instructs the processing means to execute THIRD GEAR program and actuate the components/solenoids/servos/actuators that only engage third gear. If the processing means recognizes input from block 470 it determines the selector to be in "gear selection FOURTH". The program instructs the processing means to execute FOURTH GEAR program and actuate the components/solenoids/servos/actuators that only engage fourth gear. If the processing means recognizes input from block 480 it determines the selector to be in "gear selection FIFTH". The program instructs the processing means to execute FIFTH GEAR program and actuate the components/solenoids/servos/actuators that only engage fifth gear. If the processing means recognizes input from block 490 it determines the selector to be in "gear selection SIXTH". The program instructs the processing means to execute SIXTH GEAR program and actuate the components/solenoids/servos/actuators that only engage sixth gear. Although the illustrated embodiment of FIG. 10 shows six gears and three optional selections one of ordinary skill in the art should appreciate that additional or fewer gears may be used.

Once the processing means determines the selected gear and takes appropriate action by causing the transmission to engage the selected gear, engage/disengaging the TCC, or follow one of the programmed automatic modes/selections the processing means is constantly awaiting further input regarding gear ratio/mode selection for instant output and change.

In the case of a manual one gear intent type selection performed by the operator, the processing means controls the actual engagement of the desired gear ratio based on the signals received from the input means in the gear selector. In the case of a programmed automatic mode/selection performed by the operator, the processing means may control the actual engagement of the full multitude of transmission gear ratios following the program installed into the processor and gear selection may and usually are controlled based on driving conditions. Driving conditions are ascertained by the processing means based on signals received from one or more of the input means. Other variables that the processing means may use to determine which gear ratio is optimal may include current vehicle weight, engine horse power, tire diameter or circumference, powertrain characteristics/drivetrain characteristics, such as whether vehicle is operating with front wheel drive, rear wheel drive, all-wheel drive, has the nature to lift vehicle weight as in a wheel stand or nature to spin tires under certain driving conditions or loads where in both of the conditions tire speeds are not going to be recognized as plausible in comparison to each other.

The preferred embodiments of the present invention have been described, however, it is not intended to limit the spirit and scope of the invention. It will be understood that various changes in the details, arrangements, and configuration of the parts which have been described and illustrated above in order to explain the nature of the present invention may be made by those skilled in the art within the principle and scope of the present invention as expressed in the appended claims.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more processing means, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular vehicle, computer, or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A motor vehicle transmission control system for controlling a transmission having a plurality of gears, said system comprising:
   an electronic gear selector for manual selection of gears by a user, wherein said gear selector comprises an H pattern gate;
   a processor;
   a controller;
   a communications means;
   wherein said processor accepts input comprising gear selection data from said gear selector when the user selects a gear, and transmits said input to the controller via said communications means,
   wherein said controller operably causes said transmission to shift into a gear corresponding to said gear selection data,
   wherein said gear selector is used to shift directly from a currently engaged forward gear into any other forward gear without having to shift sequentially through intermediate gears that are between said currently engaged forward gear and said other forward gear,
   wherein when the user is engaging an accelerator of said vehicle and using said gear selector to shift from a currently engaged forward gear into another selected forward gear, said gear selector transmits a signal to said processor for said transmission to change to the another selected gear and said transmission responds to said signal by changing to the another selected gear without the need for the user to release the accelerator and without use of a user operated clutch pedal.

2. The system of claim 1, wherein said gear selector comprises a gear selector gate.

3. The system of claim 2, wherein said gear selector is configured to allow a user to manually shift directly from a currently engaged gear to any other desired forward gear by manually moving a gear shift lever to the desired forward gear position in said gear selector gate and bypassing intermediate gear positions that are between said currently engaged gear and said other desired forward gear.

4. The system of claim 1, wherein said gear selector is adapted for use with an existing P (park) R (reverse) N (neutral) F (forward or drive) transmission, such that said gear selector allows the user in Forward mode to use said gear selector to manually shift directly to one of a plurality of forward gears, wherein said forward gear is selected from the group consisting of: a gear that is at least two gears away from the currently engaged gear, a gear that is at least three gears away from the currently engaged gear, a gear that is at least four gears away from the currently engaged gear, a gear that is at least five gears away from the currently engaged gear.

5. A motor vehicle transmission control method for controlling a transmission having a plurality of gears, said method comprising the steps of:
   receiving a gear selection signal from an electronic gear selector,
   processing the gear selection signal as a desired gear change,
   controlling said transmission thereby causing it to shift to the gear corresponding to said selected gear,
   wherein said gear selector is used to shift directly from a currently engaged forward gear into any other forward gear without having to shift sequentially through intermediate gears that are between said currently engaged forward gear and said other forward gear,
   wherein when a user is engaging an accelerator of said vehicle and using said gear selector to shift into another selected gear, said gear selector transmits a signal to said processor for said transmission to change to the another selected gear and said transmission responds to said signal by changing to the another selected gear without the need for the user to disengage the accelerator and without use of a user operated clutch pedal.

6. An electronic gear selector for controlling a transmission having a plurality of gears, said gear selector comprising:
   a mode selector comprising a plurality of mode positions, each defining a selectable mode;
   a gear selector gate comprising a plurality of forward gear positions;
   a processor;
   a memory;
   a gear selection means operably connected to said gear selector gate, wherein said gear selection means is manually operated by a user to select one of said forward gears by moving said gear selection means into one of said forward gear positions;
   a plurality of sensors, wherein at least one sensor is operably connected to each of said forward gear positions and each of said mode positions;
   wherein a data communications link connects each of said sensors to said processor;
   wherein said processor is configured to determine which gear has been selected by the user based on a signal received from said at least one sensor corresponding to one of said gear positions;

wherein a data communications link connects said processor to an electronic valve body, wherein said processor communicates said gear selection to said electronic valve body which is configured to electronically control said transmission in accordance with said gear selection, wherein said gear selector is configured to allow the user to control said transmission by causing it to shift from a currently engaged forward gear directly into any other forward gear without sequentially shifting through intermediate gears that are between said currently engaged forward gear and said other forward gear and without use of a user operated clutch pedal, wherein one or more preset shifting patterns are saved in said memory, and said preset shifting patterns correspond to one or more of said selectable modes.

* * * * *